United States Patent
Krtolica et al.

(10) Patent No.: US 6,266,445 B1
(45) Date of Patent: Jul. 24, 2001

(54) CLASSIFICATION-DRIVEN THRESHOLDING OF A NORMALIZED GRAYSCALE IMAGE

(75) Inventors: Radovan V. Krtolica, Los Gatos; Roger D. Melen, Los Altos Hills, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/042,016

(22) Filed: Mar. 13, 1998

(51) Int. Cl.[7] ....................................... G06K 9/62
(52) U.S. Cl. .................. 382/209; 382/217; 382/220; 382/229
(58) Field of Search ................. 382/209, 229, 382/220, 231, 210, 211, 212, 213, 214, 215, 216, 217, 218, 219, 221, 222, 223, 234, 225

(56) References Cited

U.S. PATENT DOCUMENTS

| | | | |
|---|---|---|---|
| 5,081,690 | 1/1992 | Tan | 382/50 |
| 5,307,424 * | 4/1994 | Kuehl | 382/21 |
| 5,465,308 * | 11/1995 | Hutchenson et al. | 382/159 |
| 5,818,952 * | 10/1998 | Takenouchi et al. | 382/101 |
| 5,850,480 * | 12/1998 | Scanlon | 382/229 |
| 5,875,264 * | 2/1999 | Carlstrom | 382/181 |
| 5,987,170 * | 11/1999 | Yamamoto et al. | 382/170 |
| 5,999,664 * | 12/1999 | Mohoney et al. | 382/305 |

* cited by examiner

*Primary Examiner*—David Moore
*Assistant Examiner*—Kevin Kianni
(74) *Attorney, Agent, or Firm*—Fenwick & West LLP

(57) ABSTRACT

A sample image (142) is recognized by normalizing (404) the size of a sample image (142) to the size of a referent images (146); and determining (406) a set of candidate images (147) from a set of referent images (146), wherein each of the candidate images (147) is within an acceptable distance from a different binarization (145) of the sample image (142). A system (120) for image recognition includes a scanning device (126), a normalization unit (134), a distance calculation unit (136), a classification unit (138), a disambiguation unit (140), and a display device (128).

28 Claims, 12 Drawing Sheets

GRAYSCALE
IMAGE

| 145 | 75 | 36 | 128 |
| --- | --- | --- | --- |
| 168 | 23 | 2 | 135 |
| 195 | 48 | 14 | 138 |
| 154 | 173 | 163 | 182 |

(a)

BINARY IMAGE
(T=128)

| 1 | 0 | 0 | 1 |
| --- | --- | --- | --- |
| 1 | 0 | 0 | 1 |
| 1 | 0 | 0 | 1 |
| 1 | 1 | 1 | 1 |

RECOGNIZED
AS "U"

(b)

BINARY IMAGE
(T=140)

| 1 | 0 | 0 | 0 |
| --- | --- | --- | --- |
| 1 | 0 | 0 | 0 |
| 1 | 0 | 0 | 0 |
| 1 | 1 | 1 | 1 |

RECOGNIZED
AS "L"

|   |   |   |   |
|---|---|---|---|
| 1 | 0 | 0 | 1 |
| 1 | 0 | 0 | 1 |
| 1 | 0 | 0 | 1 |
| 1 | 0 | 0 | 1 |
| 1 | 1 | 1 | 1 |

Fig. 8A — 146a

|   |   |   |   |
|---|---|---|---|
| 1 | 0 | 0 | 0 |
| 1 | 0 | 0 | 0 |
| 1 | 0 | 0 | 0 |
| 1 | 0 | 0 | 0 |
| 1 | 1 | 1 | 1 |

Fig. 8B — 146b

|   |   |   |   |
|---|---|---|---|
| 235 | 120 | 127 | 186 |
| 247 | 130 | 153 | 166 |
| 229 | 110 | 150 | 184 |
| 207 | 112 | 143 | 199 |
| 212 | 201 | 204 | 199 |

Fig. 8C — 144a (710, 712)

|   |   |   |   |
|---|---|---|---|
| 235 | 120 | 127 | 186 |
| 247 | 130 | 153 | 166 |
| 229 | 110 | 150 | 184 |
| 207 | 112 | 143 | 199 |
| 212 | 201 | 204 | 199 |

Fig. 8D — 144b (710, 712)

CLASSIFICATION-DRIVEN THRESHOLDING OF A NORMALIZED GRAYSCALE IMAGE

TECHNICAL FIELD

The present invention relates generally to image recognition, and more particularly, to a method and system for optical character recognition by classification-driven thresholding of a normalized grayscale image.

BACKGROUND ART

In the art of optical character recognition, an image classifier is a functional unit that attempts to match sample images against a set of referent images or templates. Although most character images are sampled in grayscale, which results in multiple data bits per image pixel, image classifiers are generally limited to binary (bi-level) input data. Analyzing grayscale data is substantially more complicated, and requires time-consuming, sophisticated techniques. Thus, although some grayscale classifiers exist, most readily-available image classifiers accept only binary input data. A variety of binary classifiers for optical character recognition are known in the art, such as the system described in U.S. Pat. No. 5,539,840 to Krtolica et al. for "Multifont Optical Character Recognition Using a Box Connectivity Approach," which is incorporated herein by reference.

Because the sample image comprises grayscale data, but the image classifier accepts only binary data, the sample image must be converted initially from grayscale into black and white. This step normally requires a process called thresholding or binarization, which includes selecting a median gray level (usually called a "binarization threshold" or "threshold") and changing the value of each image pixel to either zero or one, depending on whether the original gray level of the pixel had a value greater or less than that of the threshold. In conventional systems, binarization of the sample image is generally performed once, using a single threshold, after which the binary output data is provided to the image classifier.

As conventionally implemented, however, thresholding often dramatically reduces recognition accuracy. When an image is thresholded, much useful information about the image is lost. For example, an eight bit grayscale image contains eight times more data than the same thresholded image. Such data assist the human eye in recognizing the image, but are lost to conventional image recognition systems because of thresholding.

In addition, thresholding introduces harmful noise into the image. Slight deviations in the image's gray levels are often manifest after thresholding in the form of jagged edges, stray pixels, gaps, and other artifacts that reduce recognition accuracy. Moreover, after thresholding, the sample image is typically normalized to the size of the referent images. However, normalizing binary data generally compounds the noise, reducing recognition accuracy to an even greater degree. What is needed, then, is a method and system for providing binary data to a binary image classifier while retaining as much information as possible about the original grayscale image and reducing the noise associated with the processes of thresholding and normalization.

As noted earlier, in conventional systems, thresholding is normally performed as a separate step from image classification. Thus, in such systems, thresholding is merely a simplification or quantizing step. However, as shown in FIG. 1, thresholding is central to classification and is not so easily separable therefrom. For example, matrix (a) of FIG. 1 represents a grayscale image sampled at eight bits (256 gray levels) per pixel. If the binarization threshold ("T") is selected to be 128, matrix (b) illustrates the resulting binary image, which would be interpreted by a binary image classifier as the letter "U." If, however, the threshold is selected to be 140, matrix (c) illustrates the resulting binary image, which would be interpreted to be the letter "L." Both interpretations are valid. However, in each case, the selection of the binarization threshold determines which pixels are in the foreground ("1") and which pixels are in the background ("0"). Thus, the thresholding step effectively determines the classification of the image.

The foregoing situation often occurs where there is poor contrast between the foreground and background, and where the foreground or background gray levels are not uniform throughout the sampled image. The human eye can easily compensate for these anomalies. However, a conventional image recognition system that separately thresholds the image before classification will frequently produce inaccurate results. Indeed, as shown above, an arbitrary selection of either threshold will often eliminate valid, and possibly correct, interpretations of the character image.

Conventionally, a binary image classifier cannot detect such alternative interpretations based on different thresholds since the thresholding step is performed separately from classification. If thresholding could be performed with a foreknowledge of the referent images, then a number of possible interpretations of the sample image, based on different thresholds, could be determined. Moreover, only those interpretations having an acceptable "distance" from the binarized sample image could be selected.

What is needed, then, is a method and system for integrating the thresholding and classification steps such that a number of interpretations of the image are found using different thresholds. Moreover, what is needed is a method and system for selecting an interpretation wherein the distance between the binarized sample and the referent image is minimized. Hereafter, this process is called "classification-driven thresholding." What is also needed is a method and system for performing classification-driven thresholding in an efficient manner, without having to resort to exhaustive comparison of all possible thresholded images with the set of referent images. Finally, what is needed is a method and system for disambiguating a candidate set by selecting a preferred interpretation of the character image.

DISCLOSURE OF INVENTION

The present invention addresses the aforementioned problems of conventional image recognition systems by providing a method and system for image recognition by classification-driven thresholding of a normalized grayscale image. In accordance with the present invention, a sample image (142) is recognized by normalizing (404) the size of the sample image (142) to the size of the referent images (146); and determining (406) a set of candidate images (147) from the set of referent images (146), wherein each of the candidate images (147) is within an acceptable distance from a different binarization (145) of the sample image (142).

In accordance with the present invention, a system (120) for image recognition includes a scanning device (126), a normalization unit (134), a distance calculation unit (136), a classification unit (138), a disambiguation unit (140), and a display device (128).

BRIEF DESCRIPTION OF THE DRAWINGS

These and other more detailed and specific objects and features of the present invention are more fully disclosed in the following specification, reference being had to the accompanying drawings, in which:

FIG. 1 is an example of a classification problem caused by the choice of different binarization thresholds;

FIGS. 8A and 8B are examples of referent images 146;

FIG. 8C is a partitioning of a gray matrix 144 according to the foreground and background of the referent image 146a in FIG. 8A; and FIG. 8D is a partitioning of a gray matrix 144 according to the foreground and background of the referent image 146b in FIG. 8B.

DETAILED DESCRIPTION OF THE PREFERRED EMBODIMENTS

The following description is made in the context of recognizing images of handwritten or machine-printed characters. However, the principles and methods disclosed herein may be used to recognize a variety of images types, in addition to feature vectors that are used to characterize images. Thus, the scope of the present invention should not be limited only to character recognition. In addition, although the following description is in the context of recognizing grayscale images, one skilled in the art will recognize that color images may also be recognized using the method and system of the present invention.

System Architecture

Figure 2:
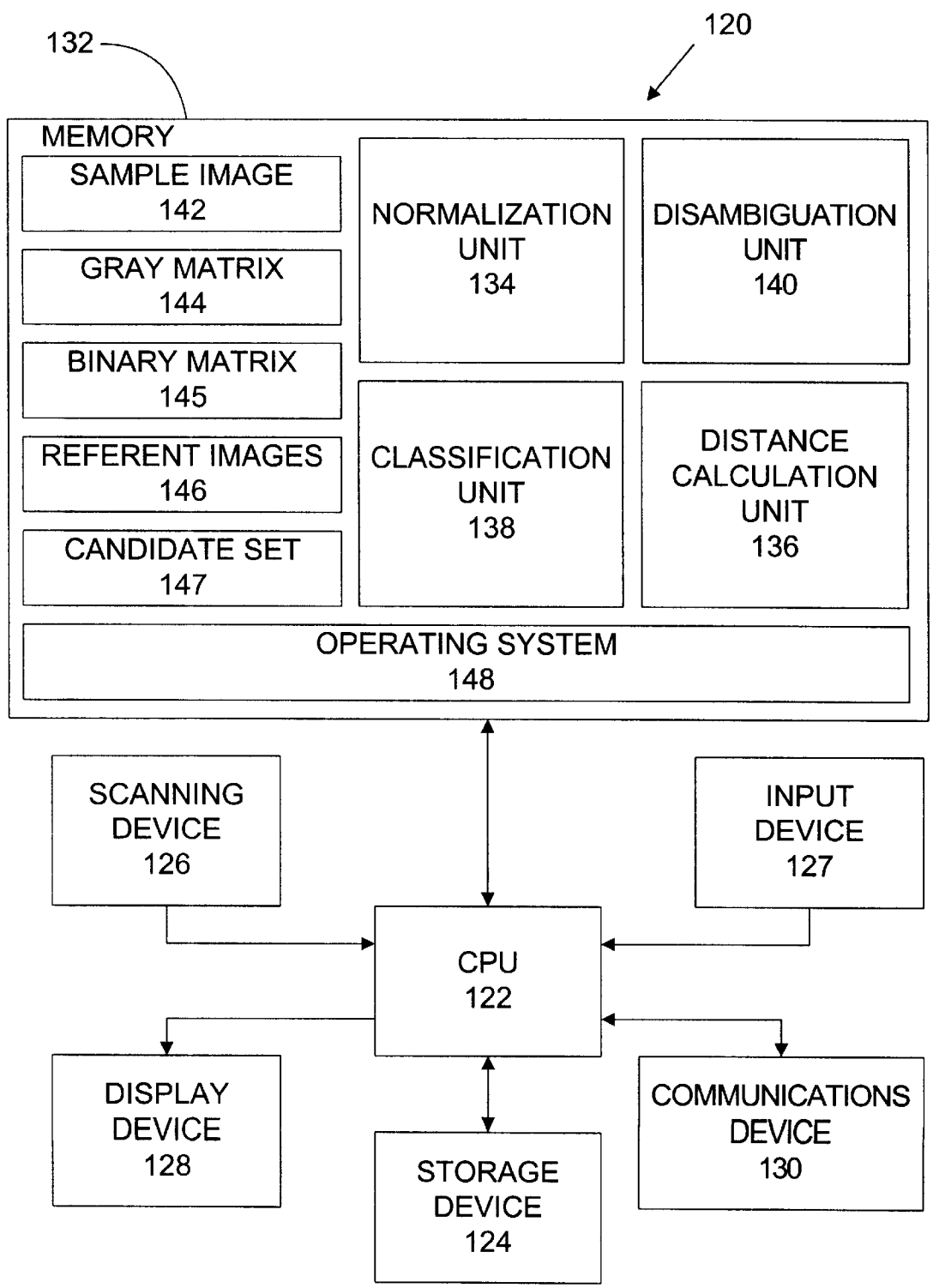
FIG. 2 is a physical block diagram of a system 120 for recognizing a character image 142 in accordance with the present invention.

Referring now to FIG. 2, there is shown a physical block diagram of a system 120 for recognizing a character image in accordance with the present invention. In one embodiment, the present invention is implemented as software running on a conventional personal computer such as an IBM® PC or compatible. Thus, the hardware architecture of system 120 as shown in FIG. 2 is preferably implemented as a combination of components of such computer, although other implementations are possible.

A central processing unit (CPU) 122 executes software instructions and interacts with other components to perform the methods of the present invention. A storage device 124 provides long term storage of data and software programs, and may be implemented as a hard disk drive or other suitable mass storage device. A scanning device 126 obtains a two-dimensional array of pixel values representing the character to be recognized. In a preferred embodiment, scanning device 126 is an "HP ScanJet IIc" model digital scanner from Hewlett Packard Co., which provides a resolution of 400 dots (pixels) per inch, each pixel being quantized with an eight-bit grayscale resolution. Input device 127, such as a mouse or keyboard, facilitates user control of the operation of system 120. A display device 128 is an output device such as a cathode-ray tube or printer for the display of text and graphics under the control of CPU 122. System 120 may also include communication device 130 such as, for example, a modem or ethernet card for connection to a computer network such as the Internet.

System 120 also includes a memory 132 for storing software instructions to be executed by CPU 122. Memory 132 is implemented using a standard memory device, such as a random access memory (RAM). In a preferred embodiment, memory 132 includes a number of software objects or modules, including a normalization unit 134, a distance calculation unit 136, a classification unit 138, and a disambiguation unit 140. Throughout this discussion, the foregoing modules are assumed to be separate functional units, but those skilled in the art will recognize that the functionality of various units may be combined and even integrated into a single software application.

In a preferred embodiment, the memory 132 is also used to store a sample image 142, a gray matrix 144, a binary matrix 145, a plurality of referent images 146, and a candidate set 147. The sample image 142 is a bitmapped grayscale image that is captured by the scanning device 126. The gray matrix 144 is preferably a two-dimensional array of integers, and is used to characterize the grayscale information in the sample image 142. The binary matrix 145 is a binarized version of the gray matrix 144, and is used in calculating the distance between the gray matrix 144 and the referent images 146. The referent images 146 are a set of previously-obtained, known templates that are compared against the gray matrix 144. Like the gray matrix 144, the referent images 146 are preferably stored as two-dimensional arrays, but contain only bi-level (binary) data. The candidate set 147 is a set of referent images 146 selected as potential candidates for recognition.

Finally, memory 132 includes an operating system 148, for managing, and providing system resources to, the above-mentioned software objects or modules. Preferably, operating system 148 is the Windows 95 operating system manufactured by Microsoft Corporation of Redmond, Wash., although other operating systems, such as UNIX, may be used within the scope of the present invention.

Dataflow of the Image Recognition System

Figure 3:
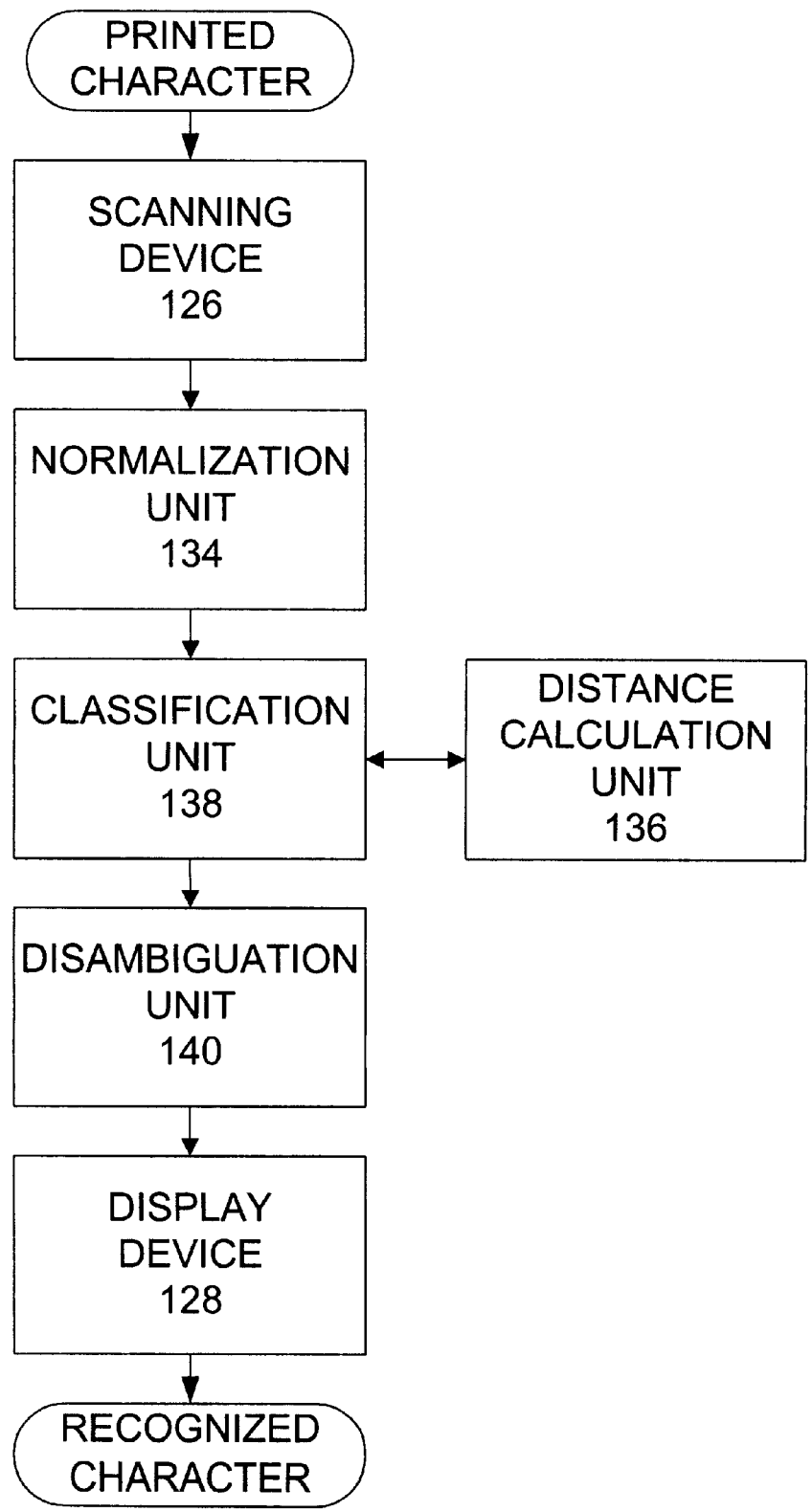
FIG. 3 is a dataflow diagram of an image recognition system 120 in accordance with the present invention.

Referring now to FIG. 3, there is shown a dataflow diagram of an image recognition system 120 in accordance with the present invention. Initially, a sample image 142 is obtained by means of scanning device 126, which obtains a pixel-by-pixel representation of an image on a scanned object, such as a piece of paper. One skilled in the art will recognize that, typically, an entire page of text is scanned at one time. This generally necessitates the additional step of segmentation, wherein the page is segmented into individual characters as described in U.S. Pat. No. 5,539,840 to Krtolica et al. for "Multifont Optical Character Recognition Using a Box Connectivity Approach," the subject matter of which is incorporated herein by reference. However, for purposes of discussion, it will be assumed that the image 142 represents only a single character, as produced by the segmentation process.

Coupled to the scanning device 126 is the normalization unit 134, which generates the gray matrix 144 by normalizing the size of the sample image 142 to the size of the referent images 146. This process will be described in greater detail below with reference to FIG. 5. Briefly, however, the normalization unit 134 maps the sample image 142 onto a grid corresponding to gray matrix 144 and calculates a pixel "weight" for the pixels mapped by each region of the grid.

In a preferred embodiment, the gray matrix 144, the binary matrix 145, and the referent images 146 have dimensions of 16×16 elements. The precise dimensions are not crucial to the invention, although they are preferably identical for each matrix. In addition, the dimensions should be chosen with several factors in mind. For example, one skilled in the art will recognize that the dimensions should be chosen in order to minimize noise, while capturing sufficient information about the edges of a character. Additionally, pragmatic concerns are relevant, such as selecting dimensions that are a power of two in order to simplify implementation in hardware and software, and selecting small enough dimensions so as not to overburden conventional memories and CPUs.

Coupled to the normalization unit 134 is the classification unit 138, which compares the gray matrix 144 with the referent images 146 in order to determine a candidate set 147. This process will be described in greater detail below with respect to FIGS. 6A–B. Unlike conventional systems, the classification 138 unit, in conjunction with the distance calculation unit 136, determines a candidate set 147 by classification-driven thresholding of the gray matrix 144. In one embodiment, this is accomplished by calculating a set of distances between the gray matrix 144, binarized at a plurality of thresholds, and the set of referent images 146. Thereafter, a candidate set 147 is selected wherein the distance between a candidate image 147 and a binarization of the sample image 142 is within an acceptable range.

Coupled to the classification unit 138 is the disambiguation unit 140, which is used to select a preferred candidate 147 if more than one is found by the classification unit 138. Briefly, this is accomplished by spatially normalizing each candidate 147 to the size of the original sample image 142, and repeating the classification method as will be described hereafter with reference to FIG. 6C.

Finally, coupled to the disambiguation unit 140 is the display device 128, such as a cathode-ray tube or printer. Display device 128 outputs the recognized candidate image 147 to a user of the system 120. If no unique candidate image 147 was identified, then the display device 128 preferably outputs an error message.

Preferred Methods for Image Recognition

Figure 4:
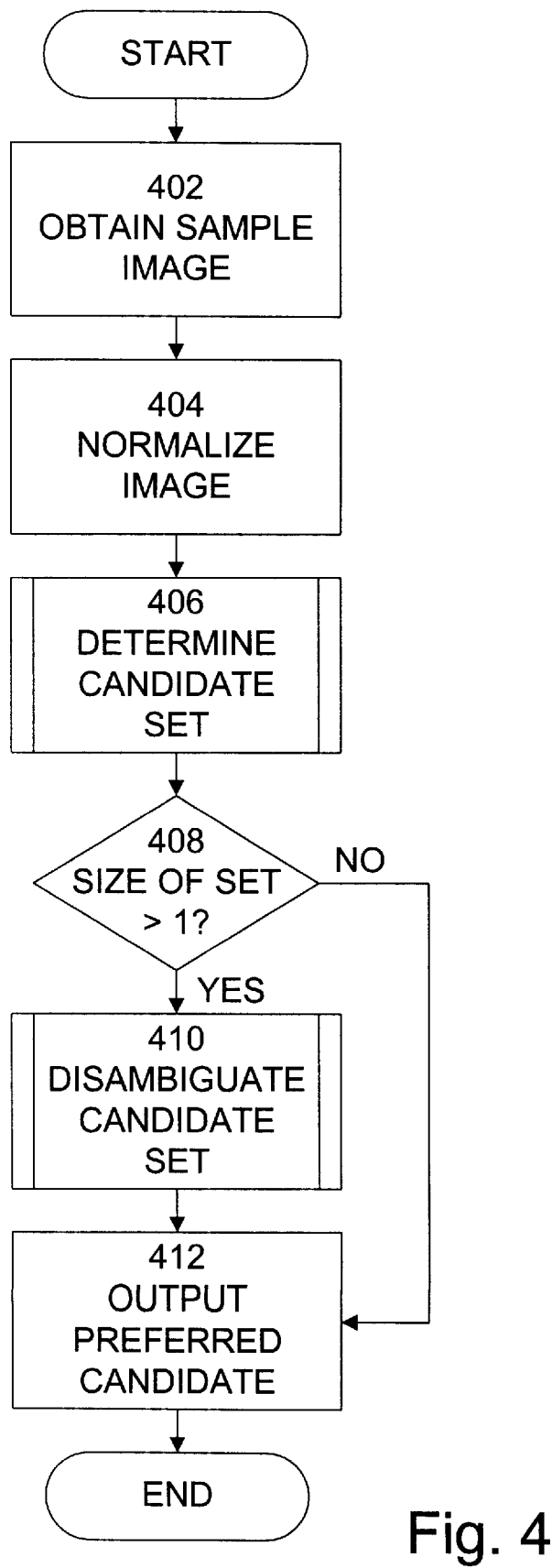
FIG. 4 is a flow diagram of a preferred method for recognizing a character image 142 in accordance with the present invention.
Figure 5:
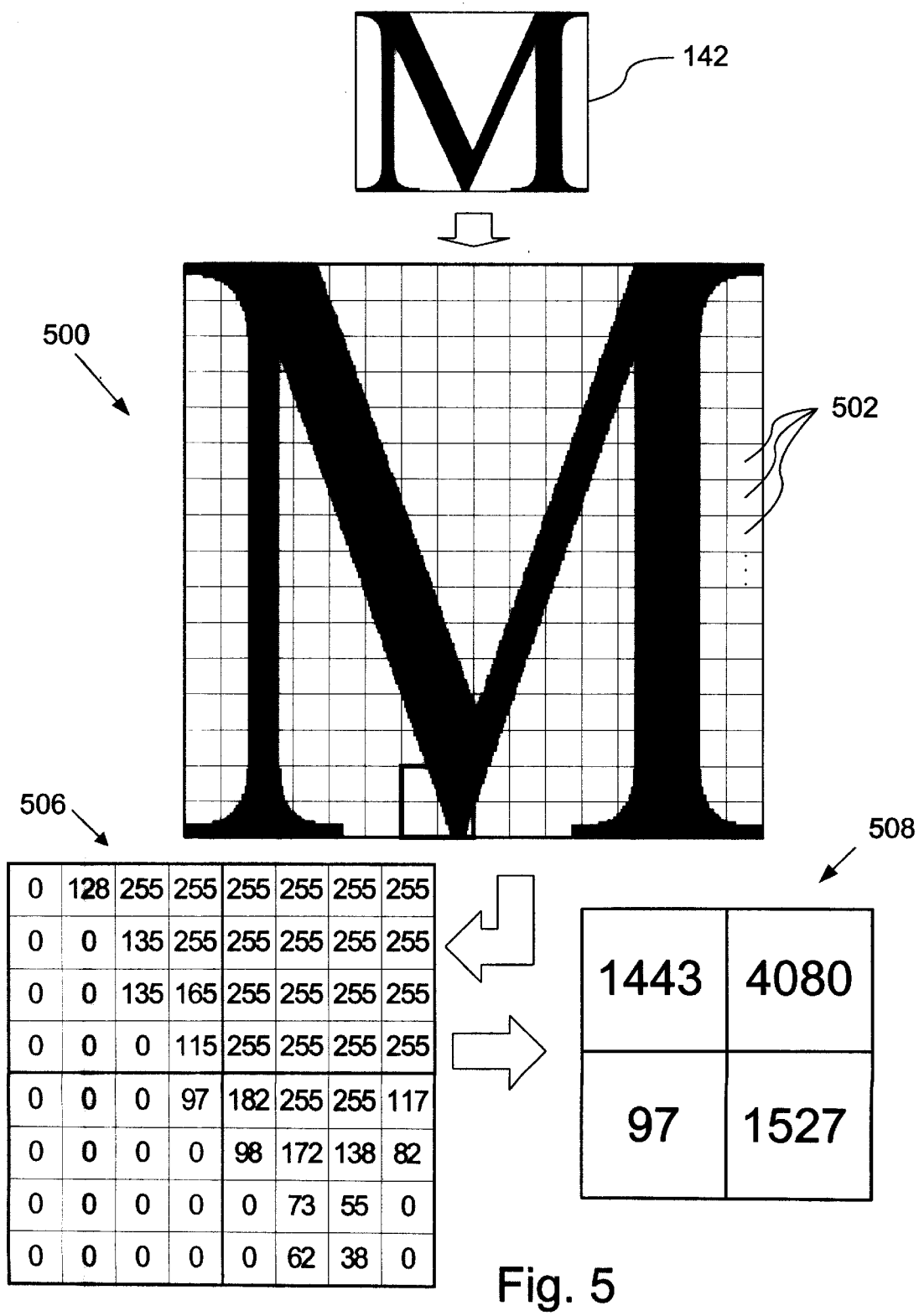
FIG. 5 is a graphical illustration of the process of normalization.

Referring now to FIG. 4, there is shown a flow diagram of a preferred method for recognizing a character image in accordance with the present invention. The method begins by obtaining 402 the sample image 142 of the character to be recognized. This is accomplished by means of the scanning device 126, which obtains a pixel-by-pixel representation of the character. Because the physical dimensions of a character varies, the pixel dimensions of the image 142 will also vary. Generally, the dimensions of a handwritten character will vary widely, and may be as large as 200 pixels high by 100 pixels wide. In contrast, a machine-printed, fourteen point character will have approximate dimensions of 48×32 pixels. Referring also to FIG. 5, there is shown a graphical illustration of the process of normalization, including a sample image 142 of the letter "M." In this example, the sample image 142 has pixel dimensions of 64×64.

The method continues by normalizing 404 the size of the sample image 142 to the size of the referent images 146. In a preferred embodiment, the referent images 146 are stored as two-dimensional matrices, each having dimensions of 16×16 elements. It is advantageous, therefore, to convert the sample image 142 into a similarly-sized matrix for purposes of comparison.

As shown in FIG. 5, the normalization step is accomplished by mapping the sample image 142 onto a 16×16 grid 500 of boxes 502. The grid 500 is used for assigning values to the gray matrix 144, each box 502 being associated with a corresponding element of the gray matrix 144. As noted above, the choice of dimensions is not crucial to the invention. However, in a preferred embodiment, the sample image 142 should be mapped onto a grid 500 with the same dimensions as the referent images 146.

As further shown in FIG. 5, because the sample image 142 has dimensions of 64×64 pixels, each box 502 is associated with 16 pixels. Additionally, as illustrated in an enlarged grid portion 506, each pixel has a corresponding gray level, which is an integer value between zero and 255. The gray level is determined by the scanning device 126 when the image 142 is obtained. Preferably, a gray level of zero corresponds to a completely white pixel, and a gray level of 255 corresponds to a completely black pixel. Values between zero and 255 represent shades of gray. However, one skilled in the art will recognize that some scanning devices 126 invert these color mappings.

After the sample image 142 is mapped onto the grid 500, a pixel "weight" is calculated for each box 502 by summing the pixel gray levels contained therein. Next, each sum is stored in the corresponding element of the gray matrix 144, as illustrated in the enlarged matrix portion 508 of FIG. 5. When the normalization process is complete, each element of the gray matrix 144 comprises an integer value corresponding to the appropriate pixel weight of the region mapped by grid 500.

One skilled in the art will recognize that the vertical dimensions of the grid 500 and the sample image 142 may be co-prime, as may the horizontal dimensions. For example, a sample image 142 with dimensions of 61×47 may be partitioned into a grid 500 with dimensions of 16×16. When this occurs, boxes 502 are likely to bisect pixels. Although approximations can be made to compensate for the problem, recognition accuracy may be impaired. Therefore, in a preferred embodiment, if a pixel is bisected, the gray level of the affected pixel is proportionately divided between the two or more boxes 502 containing the pixel. In that way, an exact calculation of the relative weight of each box 502 is enabled.

Moreover, in a preferred embodiment, the summation process described above employs rational number arithmetic implemented with integer operations, using techniques well known to those skilled in the art. In contrast, if values are calculated using floating point arithmetic, approximations are still necessary, and speed and memory problems may result. Therefore, all values are stored as rational numbers, and all functions are adapted to process rational numbers. This can be done, for example, by custom-developing such functions, or by using any of a number of standard packages for rational number arithmetic implemented with integer operations.

Referring again to FIG. 4, after the normalization step 404 is complete, the gray matrix 144 is a normalized version of the sample image 142 and comprises grayscale data. However, since the referent images 146 comprise bi-level data, the gray matrix 144 must be binarized in order to be compared with the referent images 146. Conventionally, a threshold is selected, and the grayscale data is binarized using standard thresholding techniques. However, as illustrated in FIG. 1, the selection of a single threshold may eliminate valid, and possibly correct, interpretations of the image.

Therefore, in a preferred embodiment, the classification unit 138, in conjunction with the distance calculation unit 136, determines 406 a candidate set 147 using a classification-driven thresholding of the sample image 142. The following description outlines the theory of classification-driven thresholding as well as an exhaustive method for using the technique to determine a candidate set 147. Thereafter, a more efficient, preferred method for classification-driven thresholding is presented.

Exhaustive Classification-Driven Thresholding

Figure 6:
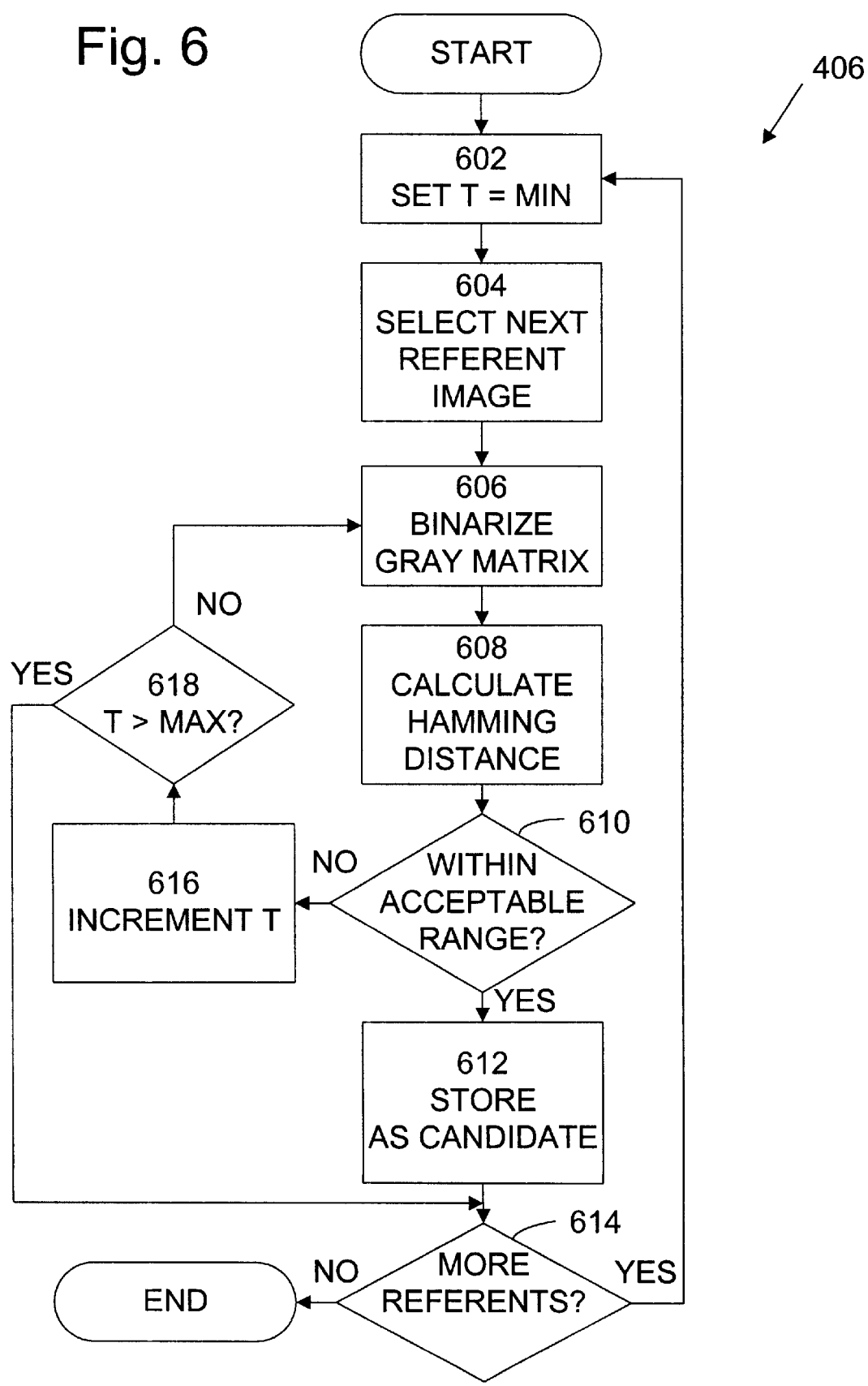
FIG. 6 is a flow diagram for an exhaustive method of determining a candidate set 147 in accordance with the present invention.

Conceptually, classification-driven thresholding is an integration of the thresholding and classification steps of image recognition wherein a candidate set is determined by comparing the gray matrix 144, binarized at all possible thresholds, with the set of referent images 146. FIG. 6 is a flow diagram of the exhaustive method of classification-driven thresholding. The method begins by setting 602 the initial threshold ("T") to a minimum value. In a preferred embodiment, the minimum value is zero. However, in alternative embodiments, T may start at other desired values, such as the lowest actual value in the gray matrix 144.

After the value of T is reset, the next referent image 146 is selected 604. Thereafter, the method continues by binarizing 606 the gray matrix 144 using T as the binarization threshold, and storing the resultant bi-level data in the binary matrix 145. In a preferred embodiment, the binarization process is performed by changing those values of gray matrix 144 that are less than or equal to T into zeros, and the values that are greater than T into ones. However, the assignment of ones and zeros could be reversed without departing from the spirit of the invention.

Thereafter, method continues by calculating 608 a distance between the binary matrix 145 and the selected referent image 146. In a preferred embodiment, a Hamming distance is used as the measure of the distance. Calculating Hamming distances is well known in the art. Given two matrices, a referent matrix R and a sample matrix S, each matrix being of the same size, and each having a total number N elements valued at either 1 (representing black) or 0 (representing white), the number of corresponding elements equal to the value 1 in both R and S being represented by C[b], the number of corresponding elements equal to the value 0 in both R and S being represented by C[w], a Hamming distance H(R,S) between the referent matrix R and the sample matrix S is defined as:

$$H(R,S) = N - (C[b] + C[w])$$ Eq. 1

One skilled in the art will recognize that a Hamming distance of zero means that the matrices R and S are identical. As the matrices become more divergent, the Hamming distance increases, until the distance reaches a maximum where one image is entirely black and the other image is entirely white. The maximum Hamming distance, therefore, between the preferred 16×16 matrices is 256.

After the distance is calculated 608, a determination 610 is made whether the distance is within an acceptable range. In one embodiment, a distance of zero is the only acceptable distance, which would require a perfect match. However, in a preferred embodiment, a low, non-zero value is chosen experimentally since noise and other effects can create stray pixels and gaps resulting in non-zero distances. In a preferred embodiment, an acceptable distance is a Hamming distance of 2.

If the distance is determined 610 to be within the acceptable range, an indication of the referent image 146 is stored 612 in the candidate set 147 in the memory 132. As noted earlier, the referent images 146 are known templates, having characters associated with them. Therefore, preferably, only the associated character and the Hamming distance need to be in the candidate set 147.

Additionally, in a preferred embodiment, if the Hamming distance associated with the current candidate 147 is acceptable but greater than that of a stored candidate 147, then the current candidate 147 should not be stored since it is less likely to be correct. Likewise, if the current candidate's 147 distance is lower than that of a stored candidate 147, then the stored candidate 147 should be discarded.

Next, a determination 614 is made whether more referent images 146 remain to be compared with the binary matrix 145. If more referent images 146 remain, then the method returns to step 602; otherwise, the method is complete.

If in step 610 it is determined that the distance is not within an acceptable range, then the method continues by incrementing 616 the value of T. In a preferred embodiment, the threshold increment is equal to the maximal weight of the elements of the gray matrix 144 divided by the number of gray levels. In the example illustrated in FIG. 5, the threshold increment is 16 (4080/255). However, the incremental value may be 1 or any other number, although one skilled in the art will recognize the trade-off between speed and accuracy in the choice of the threshold increment.

After T is incremented 616, a determination 618 is made whether T exceeds a pre-determined maximum. In a preferred embodiment, the maximum is the largest possible value of an element of the gray matrix 144, and will vary according to the number of pixels contained in each box 502. For example, in FIG. 5, each box 502 contains 16 pixels. Therefore, the maximum value for an element of the gray matrix 144 is 4080 (255*16). In an alternative embodiment, the maximum could be the set to the largest actual value stored in the gray matrix 114, since tresholding beyond that value will produce identical binary matrices 145. If the maximum was exceeded in step 616, then the method continues at step 614; otherwise, the method returns to step 606 in order to binarize the gray matrix 144 at the new threshold.

Figures 7A, 7B, 7C, 7D:
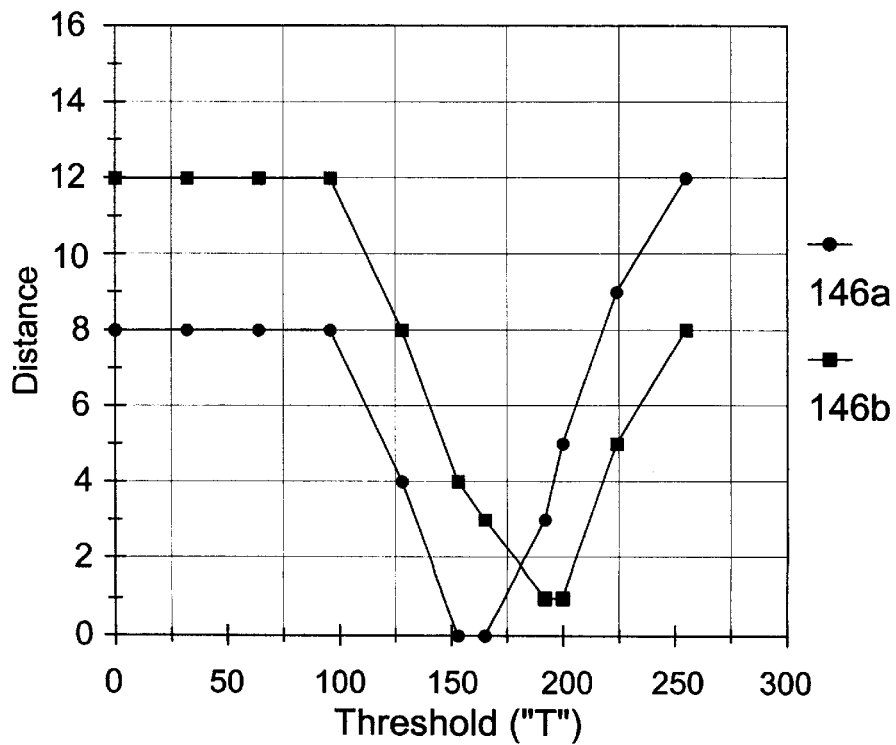
FIG. 7A is an example of a gray matrix 144.
FIGS. 7B and 7C are examples of referent images 146.
FIG. 7D is a graph of Hamming distances calculated between a gray matrix 144, at a number of thresholds, and two referent images 146a and 146b, respectively.

This "exhaustive" method of classification-driven thresholding is illustrated in FIG. 7D, which is a graph of Hamming distances calculated between the gray matrix 144 of FIG. 7A, binarized at a number of thresholds, and two referent images 146a and 146b shown in FIGS. 7B and 7C, respectively. For ease of illustration, the gray matrix 144 and the two referent images 146a–b each have dimensions of 5×4 elements. Moreover, in a preferred embodiment, the matrix 144 would be binarized at each integer value between zero and 255. However, for simplicity, the distances shown in FIG. 7D are calculated only at the points indicated, and the lines, therefore, are provided merely for visualization purposes.

As shown in FIG. 7D, the Hamming distance between the binarized gray matrix 144 and the referent image 146 a reaches a minimum, in this case zero, at T=153. Therefore, if the gray matrix 144 is binarized at T=153, the resulting binary matrix 145 is identical to referent image 146a. Thereafter, as T increases, the distance starts to increase beginning at T=166. A similar graph is provided for the referent image 146b, although the minimum distance is 1, and is reached at T=199.

Each of the graphs in FIG. 7D may be expressed mathematically by the function $$F(T; B, N) := \sum_{i=0}^{m-1}\sum_{j=0}^{n-1} |B_{ij} - I(N_{ij} - T)| \qquad \text{Eq. 2}$$

where $B_{ij}$ and $N_{ij}$ are elements of the m×n matrices B (referent image 146) and N (gray matrix 144), respectively, T is the threshold, and I is the step function:

$$I(x) := \begin{cases} 0, & x \leq 0 \\ 1, & x > 0 \end{cases} \qquad \text{Eq. 3}$$

By application of the foregoing method, a set 147 of candidate images with acceptable distances from the gray matrix 144 may be determined. However, this method is "exhaustive" because it must calculate the distances between the gray matrix 144, binarized at each integer value between zero and 255, and each referent image 146. One skilled in the art will recognize a large number of calculations is required. For example, assuming there are 256 gray levels and 256 referent images 146, then 65536 (256*256) distances would need to be calculated in order to determine the candidate set 147. For many computers, this process would be too slow to be practical.

Efficient Method for Classification-Driven Thresholding

A more efficient method for classification-driven thresholding can be achieved by recognizing that the set of referent images 146 is known. Thus, not all distance calculations need to be made. Indeed, only a few distance calculations may be required in order to find the minimum Hamming distance. In order to achieve this goal, it must be understood that each graph in FIG. 7D represents, not single a function, but the sum of two functions—one representing the distance between the "foreground" of the reference image 146 and the corresponding elements of the gray matrix 144, and one representing the distance between the "background" of the referent image 146 and the corresponding elements of the gray matrix 144. In a preferred embodiment, the "foreground" is that part of the referent image 146 that contains ones, whereas the "background" is that part of the image 146 that contains zeros.

Figure 7E:
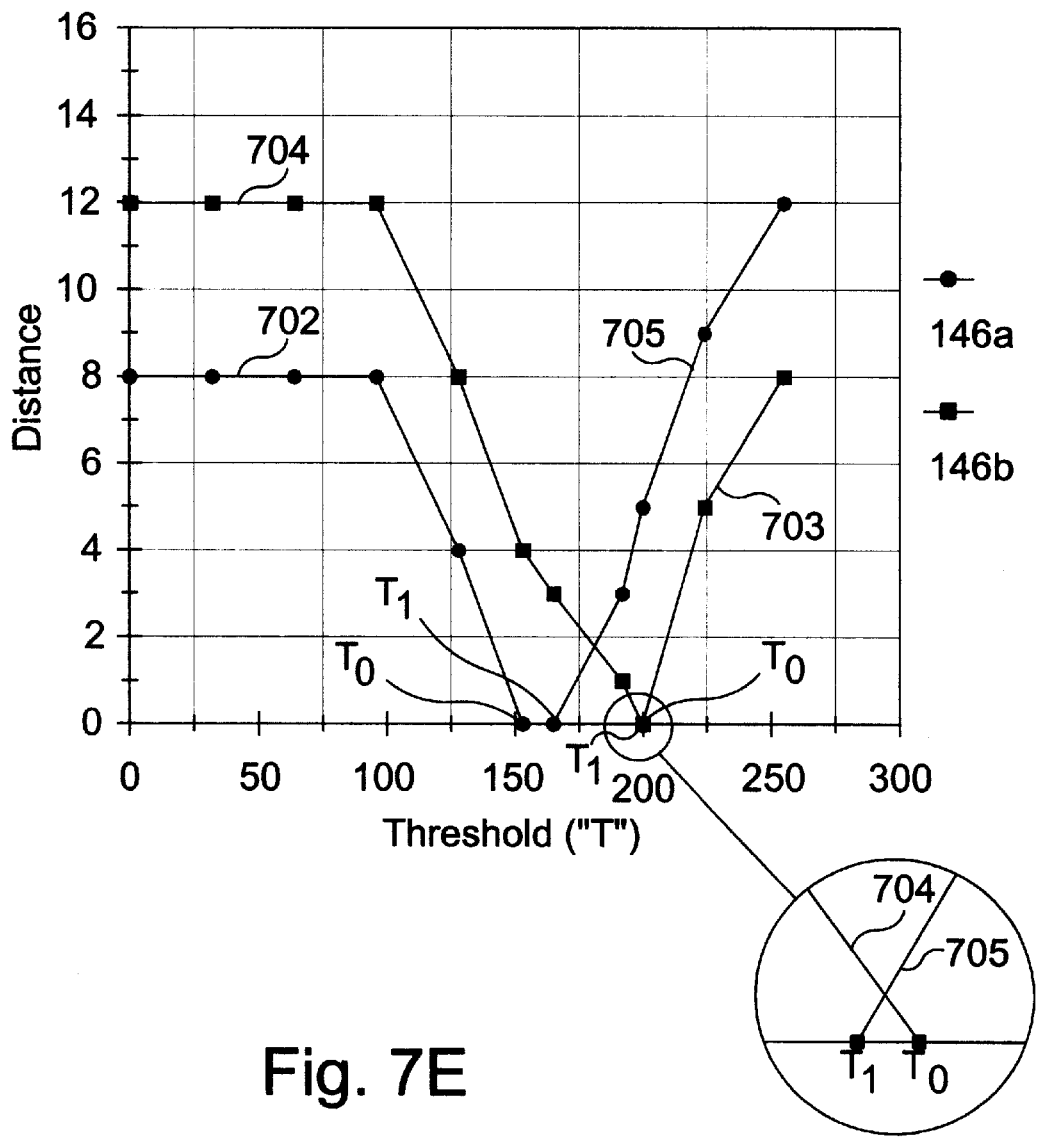
FIG. 7E is a graph of Hamming distances between portions of a gray matrix 144, at a number of thresholds, and portions of two referent images 146a and 146b, respectively.

Referring now to FIG. 7E, there are shown four graphs 702, 703, 704, and 705, corresponding to the distance functions described above. Graph 702 represents the distance between the background of image 146 a and the corresponding elements of the gray matrix 144. Graph 703 represents the distance between the foreground of image 146a and the corresponding elements of the gray matrix 144. Graphs 704 and 705 are similar to graphs 702 and 703, except that they are associated with image 146b.

It can be shown mathematically that the functions represented by graphs 702 and 704 are monotonically nonincreasing functions of T. In addition, it can be shown mathematically that the functions represented by graphs 703 and 705 are monotonically nondecreasing functions of T. In the description that follows, the value of T where the nonincreasing graphs 702 and 704 intersect the zero-threshold axis (T) will be called hereafter "$T_0$." Likewise, the value of T where the nondecreasing functions intersect the T-axis will be called hereafter "$T_1$." Mathematically, these values may be calculated as follows:

$$T_0 := \max\{N_{ij}| \text{ for all } i, j \text{ such that } B_{ij}=0\};$$
$$T_1 := \min\{N_{ij}| \text{ for all } i, j \text{ such that } B_{ij}=1\}-1; \qquad \text{Eq. 4}$$

FIG. 7E illustrates $T_0$ and $T_1$ for the matrices shown.

Based on the mathematical properties of these functions, the values for $T_0$ and $T_1$ can be used to determine whether the minimum Hamming distance is zero, or, alternatively, to determine the range of thresholds wherein the distance is minimized. For example, if $T_0 \leq T_1$, then the Hamming distance will be zero for all values of T between $T_0$ and $T_1$. On the other hand, if $T_0 > T_1$, then the Hamming distance will be greater than zero for all values of T, although the minimum distance will be found between $T_1$ and $T_0$. Thus, by knowing the values of $T_0$ and $T_1$, it is possible to avoid many binarization and distance calculations. This process is much more efficient and, therefore, provides a preferred method for classification-driven thresholding.

Figure 6A:
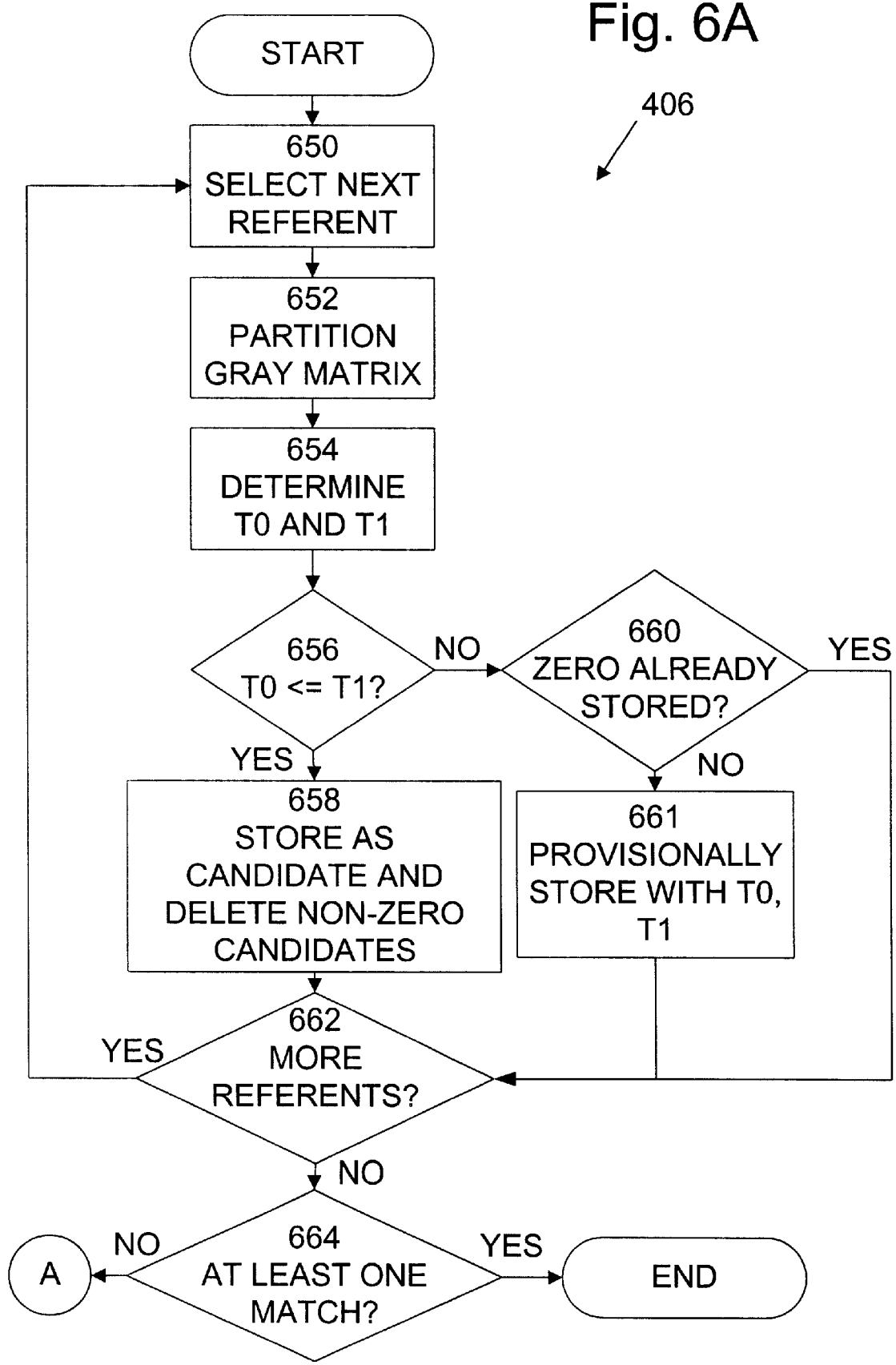
FIGS. 6A and 6B are a flow diagram for a preferred method of determining a candidate set 147 in accordance with the present invention.

Referring now to FIG. 6A, there is shown a flow diagram for a preferred method of determining a candidate set 147 by classification-driven thresholding in accordance with the present invention. As explained above, the method must first determine values for $T_0$ and $T_1$ with respect to a referent image 146. Therefore, in a preferred embodiment, the method begins by selecting 650 the next referent image 146. Thereafter, as illustrated in FIGS. 8C and 8D, the gray matrix 144 is partitioned 652 into a foreground portion 710 (shown in boldface), and a background portion 712, corresponding to the foreground and background of the selected referent image 146. In the examples shown, partitioned matrix 144a corresponds to a partitioning according to selected referent image 146a of FIG. 8A, and partitioned matrix 144b corresponds to a partitioning according to selected referent image 146b of FIG. 8B.

After the gray matrix 144 is partitioned 652, the method continues by determining 654 values for $T_0$ and $T_1$. In a preferred embodiment, $T_0$ is determined by finding the maximum value in the background portion 712 of the gray matrix 144. In the case of partitioned matrix 144a, $T_0$ is 153; with respect to partitioned matrix 144b, $T_0$ is 199. Thereafter, $T_1$ is determined by finding the minimum value in the foreground portion 710 minus one. In the case of partitioned matrix 144a, $T_1$ is 165 (i.e., 166−1); with respect to partitioned matrix 144b, $T_1$ is 198 (i.e., 199−1).

Next, the method continues by determining 656 whether $T_0 \leq T_1$. As explained above, if $T_0 \leq T_1$, then the Hamming distance between the binary matrix 145 and the referent image 146 is zero for all values of T between and including $T_0$ and $T_1$. This is true, for example, in the case of partitioned matrix 144a of FIG. 8C, where $T_0$ (153) is less than $T_1$ (165). Thus, if partitioned matrix 144a is binarized with T=153, for example, the resultant binary matrix 145 will be identical to referent image 146a, and a perfect match is found. This may be verified graphically in FIG. 7D, wherein the Hamming distance at T=153 is shown to be zero.

If it is determined 656 that $T_0 \leq T_1$, the method continues at step 658 by storing 658 an indication of the current referent image 146 in the candidate set 147 and removing any candidates 147 with distances greater than zero. In a preferred embodiment, if an image 146 perfectly matches the binary matrix 145, any candidates 147 having non-zero distances from the binary matrix 145 should be discarded since they are less likely to be the correct interpretation. As will be explained below, candidates 147 with non-zero distances (i.e. $T_0 > T_1$) are provisionally stored with their associated $T_0$ and $T_1$ values. Therefore, they may be easily identified and discarded.

If, however, it is determined in step 656 that $T_0 > T_1$, the method continues by determining whether a candidate 147 was already found with a minimum Hamming distance of zero. Preferably, if a perfect match was already found, there is no need to store a less-than-perfect match. Therefore, if a candidate 147 has already been found with a zero distance, the method continues at step 662; otherwise, the method continues by provisionally storing 661 an indication of the current referent image with its associated values for $T_0$ and $T_1$.

In a preferred embodiment, the actual Hamming distance is preferably not calculated at this point in order to reduce unnecessary calculations. It is enough to recognize that the minimum Hamming distance for the candidate 147 will be non-zero for all thresholds. Later, if a candidate 147 with a zero minimum distance is identified, all non-zero candidates 147 are discarded, regardless of the distance.

An example of a case where $T_0 > T_1$ is seen in partitioned matrix 144b, wherein the value for $T_0$ (199) exceeds the value of $T_1$ (198). As explained above, this means that the minimum Hamming distance will be greater than zero for all values of T, and the minimum will be found between $T_0$ and $T_1$. This can be verified graphically with reference to FIG. 7D. As noted above, the minimum distance does not need to be calculated at this point. Instead, an indication of the image 146b is provisionally stored 661 along with its associated values for $T_0$ and $T_1$, i.e., 199 and 198, respectively.

After either steps 658 or 661, the method continues by determining 662 whether more referents 146 remain to be compared with the binary matrix 145. If more referents 146 remain, the method returns to step 650; otherwise, the method continues at step 664 by determining whether at least one perfect match ($T_0 \leq T_1$) was found by step 656. If at least one perfect match was found, the method 406 terminates because a highly-probable candidate set 147 has been determined.

Figure 6B:
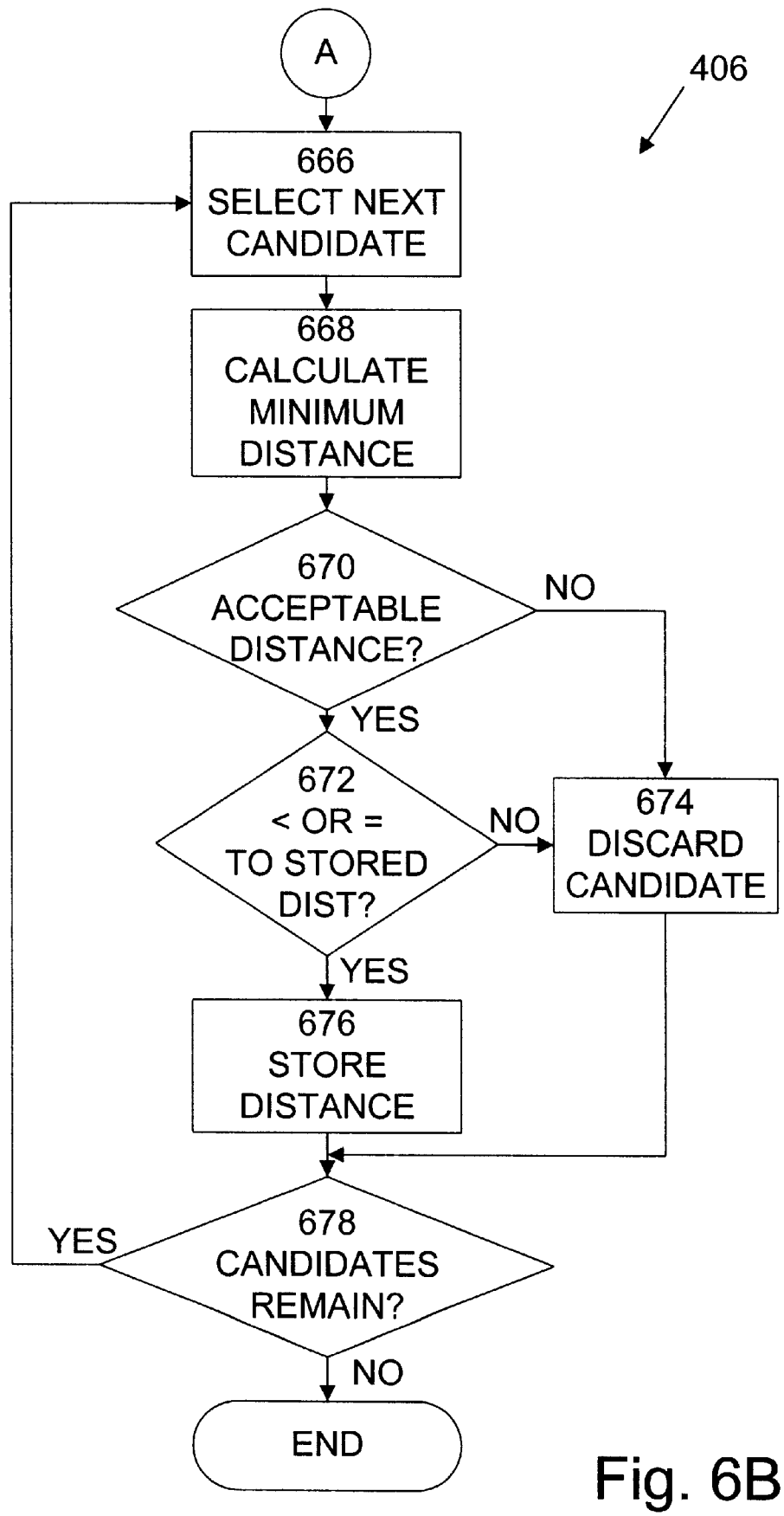

Referring now to FIG. 6B, if no perfect match was found, candidate set 147 comprises a number of provisionally stored candidates with $T_0$ and $T_1$ values. Therefore, it is necessary to find the minimum Hamming distances for each provisionally stored candidate 147. Thereafter, in a preferred embodiment, only those candidates 147 with acceptable distances will be retained; all others will be discarded.

The method continues after step 664 by selecting 666 the next stored candidate 147. Preferably, only those candidates 147 for which a distance has not been calculated are selected. Next, the minimum distance is calculated 668 between the candidate 147 and the gray matrix 144. Unlike the exhaustive method, however, not all possible binarizations need to be tested. As noted earlier, the minimum Hamming distance may be found by thresholding the gray matrix 144 at values between $T_1$ and $T_0$. Accordingly, the gray matrix 144 is binarized at each integer value between $T_1$ and $T_0$, and the distance from the candidate 147 is calculated. The lowest distance found is selected as the minimum distance.

Although this step requires some distance calculations, one skilled in the art will recognize that far fewer calculations are required than in the exhaustive method. Indeed, if image 146b of FIG. 8B is the selected candidate, only two distance calculations are required (at T=198 and 199), as opposed to the 256 calculations required in the exhaustive method. Moreover, it is possible to reduce the number of distance calculations even more by using a vector quantization technique based on triangle inequalties as described by Allen Gersho and Robert M. Gray in "Vector Quantization and Signal Compression", Kluwer Academic Publications, Boston, 1992 (fifth printing 1996).

After the minimum distance is calculated 668 for the selected candidate 147, the method continues by determining 670 whether the distance is within an acceptable range. As explained above, the acceptable range is preferably determined experimentally in order to select a small, highly-probable candidate set 147. If the distance is not acceptable, the candidate 147 is discarded 674; otherwise, a determination 672 is made whether the calculated minimum distance is less than or equal to those of the candidates 147 whose distances were previously determined. In a preferred embodiment, if the calculated minimum distance is greater than a previously determined distance, the selected candidate 147 is less likely to be correct and is therefore discarded 674. However, if the calculated minimum distance is less than or equal to that of a previously determined distance, the method continues by storing 676 the distance in the candidate set 147.

After either steps 674 or 676, the method continues by determining whether any candidates remain for which the minimum distance has not been determined. If more candidates remain, the method returns to step 666; otherwise the method is complete.

Referring again to FIG. 4, after the candidate set 147 is determined 406 using classification-driven thresholding, the method continues by determining 408 whether the size of the candidate set 147 is greater than one. Preferably, no more than one character is selected as the recognized character. Therefore, if more than one candidate 147 was found in step 406, the method continues by disambiguating 408 the candidate set 147.

An example of an ambiguous candidate set 147 is illustrated in FIG. 1, wherein two interpretations of the grayscale image 142 are possible depending on the threshold selected. For example, if T=128, then the image 142 is interpreted as the letter "U." However, if T=140, then the image 142 is interpreted as the letter "L." Both interpretations are valid, and each interpretation provides a Hamming distance of zero. A conventional image classifier would miss one of the interpretations because, conventionally, the image 142 is binarized with a single threshold prior to classification. However, in the present invention, a candidate set 147 would be determined 406 comprising both interpretations. Nevertheless, only one interpretation is correct if the human eye can recognize the character as either "U" or "L."

As noted earlier, the original source image 142 contains more data about the scanned 5object than the normalized grayscale matrix 144. Indeed, as illustrated in FIG. 5, 16 pixels of the source image 142 are used to create one element of the gray matrix 144. Therefore, the additional information in image 142 may assist in disambiguating the candidate set 147 and selecting the preferred character.

The process of disambiguation is similar to method described in FIGS. 6A–B. However, as explained in greater detail below, each of the referent images 146 of the candidates 147 are first spatially normalized (enlarged) to the size of the source image 142, rather than reducing the source image 142 to the size of the referent images 146 as was done previously. Thereafter, the classification-driven thresholding method of FIGS. 6A–B is repeated to calculate a new candidate set 147.

Because of the additional image data available in the sample image 142, it is expected that repeating the classification-driven thresholding technique will eliminate some of the original candidates 147. One skilled in the art, however, will recognize that this process can result in a large number of calculations, given the relatively larger size of the source image 142. Nevertheless, in a preferred embodiment, the candidate set 147 will likely be small, such that only a few interpretations need to be reevaluated.

Figure 6C:
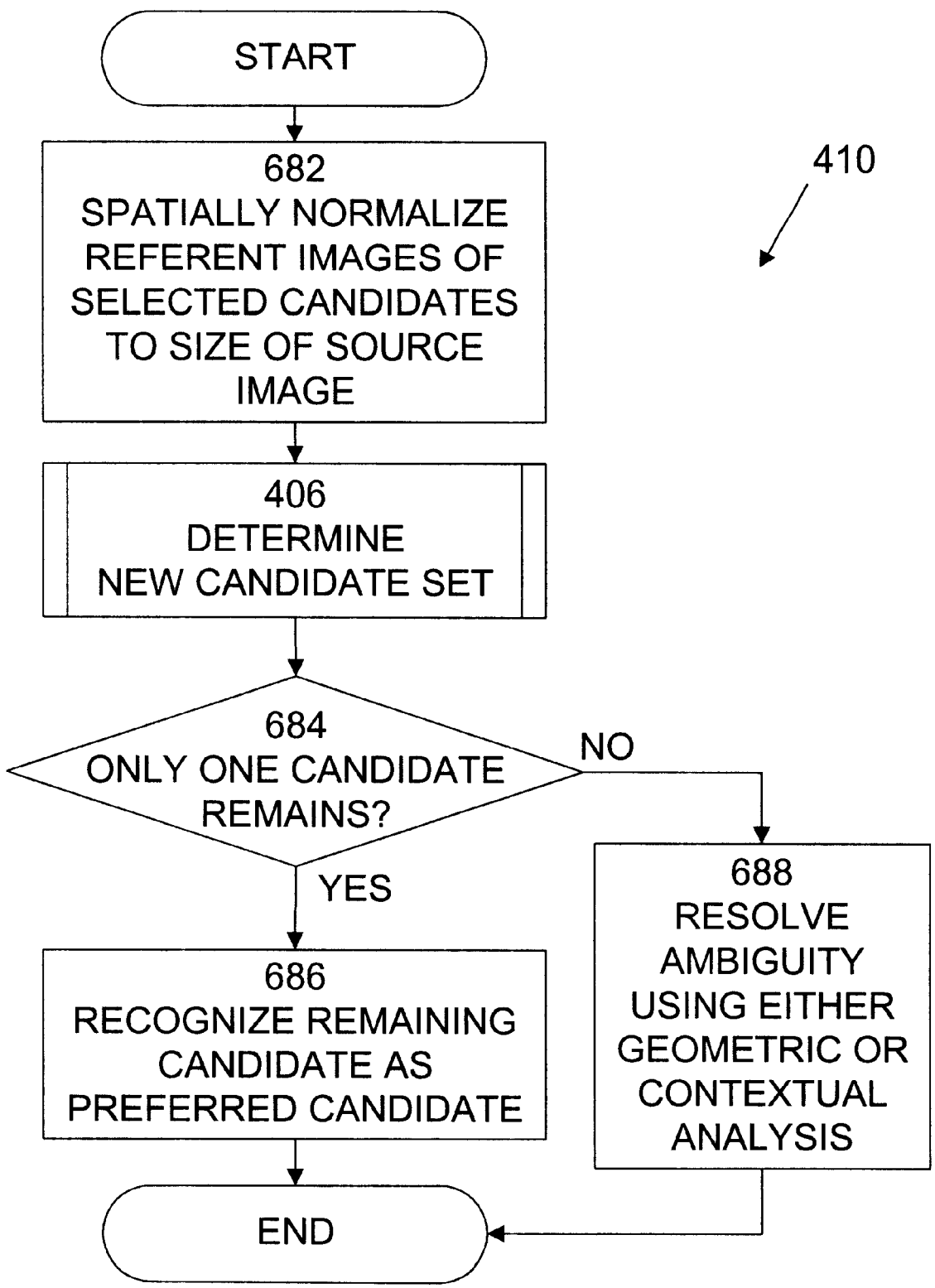
FIG. 6C is a flow diagram for a preferred method of disambiguating a candidate set 147 in accordance with the present invention.

Referring now to FIG. 6C, there is shown a preferred method for disambiguating 410 the candidate set 147 and selecting a preferred candidate. The method begins by spatially normalizing 682 the referent images 146 of the selected candidates 147 to the size of the source image 142. Techniques for spatial normalization of binary images are well known in the art. For example, if the referent image 146 with dimensions of 16×16 is spatially normalized (enlarged) to the size of the sample image 142 with dimensions of 64×64, one skilled in the art will recognize that each pixel of the referent image 146 must be reproduced 16 times in the enlarged image. When complete, a set of normalized referent images 146 is created.

In a preferred embodiment, the method continues by determining 406 a new candidate set 147 using substantially the same method described in FIGS. 6A–B. However, this time, the gray matrix 144 is, in fact, the sample image 142, and the referent images 146 are the set of normalized referent images 146 produced in step 682. Preferably, one modification that should be made to the method described is to increase the acceptable distance in step 670 to take into account the relatively larger size of the new gray matrix 144 (sample image 142 ).

When step 406 is complete, a determination 684 is made whether only one candidate 147 remains. If so, the remaining candidate 147 is recognized as the preferred candidate 147. However, if more than one candidate 147 is found, in one embodiment, all of the candidates 147 are rejected. However, in an preferred embodiment, the ambiguity is resolved 688 using either contextual or geometric analysis.

Briefly, contextual analysis is the process of resolving ambiguities by referring to the letters or words surrounding the character in question, possibly with reference to a dictionary or the like. For example, in deciding between the letters "U" and "L," the fact that the first seven letters in the word were with "GRAYSCA" would suggest that the correct interpretation is "L" (in order to spell the word "GRAYSCALE")

Similarly, geometric analysis is the process of eliminating impossible candidate choices by examining the geometric properties of the scanned character. For example, in deciding between the letters "W" and "I," by referring back to the size of the original sample image 142, the letter "I" could be eliminated if the image 142 was relatively wide. Both techniques are well known to one skilled in the art of optical character recognition. For example, U.S. Pat. No. 5,539,840 to Krtolica et al. for Multifont Optical Character Recognition Using a Box Connectivity Approach, discloses a process of eliminating characters based on geometric properties of the minimal bounding frame. After either step 686 or step 688, the method terminates.

Referring again to FIG. 4, after either steps 408 or 410, the preferred candidate 147 is output, for example, by means of the display device 128 or the communications device 130. Alternatively, the preferred candidate 147 may be stored in the storage device 124. If no candidate 147 was identified, or if the ambiguity was not resolved, the system 120 preferably outputs an error message.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. In an image recognition system, a method for recognizing a sample image comprising a plurality of pixels from a set of binary referent images, each pixel of the sample image comprising a multi-bit value, the method comprising:

normalizing the size of the sample image to the size of the referent images; and determining a set of candidate images from the set of referent images, wherein each of the candidate images is within an acceptable distance from a different binarization of the sample image, by performing the following substeps for each referent image:

determining a range of binarization thresholds for the sample image, creating a binarization of the sample image using a selected binarization threshold in the range by setting those pixel values of the sample image greater than the threshold to one of two values, and setting those pixel values of the sample image less than or equal to the selected threshold to another of the two values, calculating a distance between the selected referent image and the binarization of the sample image for the selected binarization threshold, and responsive to the distance being acceptable, selecting the referent image as a candidate in a set of candidate images for the sample image, and responsive to the distance being unacceptable, selecting another binarization threshold in the range, and repeating the creating, calculating, responsive to the distance being acceptable, selecting the referent image as a candidate, and responsive to the distance being unacceptable, selecting another binarization threshold in the range substeps until the range of thresholds for the referent image is exhausted.

2. The method of claim 1, further comprising:

responsive to the set of candidate images comprising more than one image, disambiguating the candidate set by selecting a preferred candidate image for recognition.

3. The method of claim 2, wherein the disambiguation step comprises:

spatially normalizing the candidate images to the size of an unnormalized sample image; and determining a second set of candidate images from the normalized candidate images, wherein each of the second set of candidate images is within an acceptable distance from a different binarization of the unnormalized sample image.

4. The method of claim 3, further comprising:

responsive to the second set of candidate images comprising more than one image, selecting a preferred candidate image by a method from the group of methods comprising geometric analysis and contextual analysis.

5. The method of claim 1, wherein the distance is a Hamming distance.

6. The method of claim 1, wherein the image to be recognized is a character image.

7. The method of claim 1, wherein the determining a range of binarization thresholds for the sample image substep comprises:

for each referent image, partitioning the pixels of the sample image into a foreground portion and a background portion corresponding to the foreground and background of the referent image;

determining a first binarization threshold range endpoint corresponding to a maximum pixel value in the background portion; and determining a second binarization threshold range endpoint corresponding to a minimum pixel value in the foreground portion minus one.

8. The method of claim 7, wherein the referent image is not selected as a candidate when a previously selected candidate has an associated minimum distance less than the minimum distance of the referent image.

9. The method of claim 7, further comprising:
responsive to the minimum distance of the referent image being zero, discarding any previously selected candidates having associated minimum distances greater than zero.

10. The method of claim 1, wherein the normalization step comprises:
mapping the sample image onto a grid of boxes;
summing the pixel values contained within each box; and
storing the sum of the pixel values within a corresponding location of a normalized sample image.

11. The method of claim 10, wherein the value of a pixel bisected by the grid is proportionately divided between the boxes containing the pixel, and the proportional values are calculated using rational number arithmetic implemented with integer operations.

12. A system for recognizing a sample image comprising a plurality of pixels from a set of binary referent images, each pixel of the sample image comprising a multi-bit value, the system comprising:
a normalization unit for normalizing the size of the sample image to the size of the referent images;
coupled to the normalization unit, a distance calculation unit for calculating a distance and sending the distance, and
coupled to the normalization unit and the distance calculation unit, a classification unit adapted for determining a set of candidate images from the set of referent images, wherein each candidate image is within an acceptable distance from a different binarization of the sample image, by performing the following steps:
for each referent image, determine a range of binarization thresholds for the sample image;
creating a binarization of the sample image using a selected binarization threshold in the range by setting those pixel values of the sample image greater than the threshold to one of two values, and setting those pixel values of the sample image less than or equal to the selected threshold to another of the two values;
requesting the distance calculation unit to calculate a distance between the selected referent image and the binarization of the sample image for the selected binarization threshold;
receiving the distance;
responsive to the distance being acceptable, selecting the referent image as a candidate in a set of candidate images for the sample image; and
responsive to the distance being unacceptable, selecting another binarization threshold in the range, and repeating the creating, calculating, responsive to the distance being acceptable, selecting the referent image as a candidate, and responsive to the distance being unacceptable, selecting another binarization threshold in the range substeps until the range of thresholds for the referent image is exhausted.

13. The system of claim 12, further comprising:
coupled to the classification unit, a disambiguation unit for disambiguating the candidate set and selecting a preferred candidate image for recognition by comparing the candidate images with an unnormalized sample image.

14. The system of claim 12, wherein the image to be recognized is a character image.

15. The system of claim 12, wherein the distance is a Hamming distance.

16. A computer-readable medium having computer-readable code embodied therein for recognizing a sample image comprising a plurality of pixels from a set of binary referent images, each pixel of the sample image comprising a multi-bit value, the computer-readable medium comprising:
computer-readable program code devices configured to normalize the size of the sample image to the size of the referent images; and
computer-readable program code devices configured to determine a set of candidate images from the set of referent images, wherein each of the candidate images is within an acceptable distance from a different binarization of the sample image, comprising:
computer-readable program code devices configured to determine for each referent image, a range of binarization thresholds for the sample image,
computer-readable program code devices configured to create a binarization of the sample image using a selected binarization threshold in the range by setting those pixel values of the sample image greater than the threshold to one of two values, and setting those pixel values of the sample image less than or equal to the selected threshold to another of the two values,
computer-readable program code devices configured to calculate a distance between the selected referent image and the binarization of the sample image for the selected binarization threshold, and
computer-readable program code devices configured to responsive to the distance being acceptable, select the referent image as a candidate in a set of candidate images for the sample image, and
computer-readable program code devices configured to responsive to the distance being unacceptable, select another binarization threshold in the range, and repeat the create, calculate, responsive to the distance being acceptable, select the referent image as a candidate, and responsive to the distance being unacceptable, select another binarization threshold in the range substeps until the range of thresholds for the referent image is exhausted.

17. The computer-readable medium of claim 16, wherein the computer-readable program code devices configured to determine the set of candidate images comprise:
computer-readable program code devices configured to partition the pixels of the sample image into a foreground portion and a background portion corresponding to the foreground and background of the referent image;
computer-readable program code devices configured to determine a first value corresponding to the maximum pixel value in the background portion;
computer-readable program code devices configured to determine a second value corresponding to the minimum pixel value in the foreground portion minus one;
computer-readable program code devices configured to, responsive to the first value being no greater than the second value, select the referent image as a candidate; and
computer-readable program code devices configured to, responsive to the first value being greater than the second value:

calculate a minimum distance between the sample image and the referent image; and responsive to the minimum distance being within an acceptable range, select the referent image as a candidate.

18. The computer-readable medium of claim 16, further comprising:

computer-readable program code devices configured to disambiguate the candidate set by selecting a preferred candidate image for recognition.

19. The computer-readable medium of claim 16, wherein the computer-readable program code devices configured to disambiguate the candidate set comprise:

computer-readable program code devices configured to spatially normalize the candidate images to the size of an unnormalized sample image; and computer-readable program code devices configured to determine a second set of candidate images from the normalized candidate images, wherein each of the second set of candidate images is within an acceptable distance from a different binarization of the unnormalized sample image.

20. In an image recognition system, a method for recognizing a sample image comprising a plurality of pixels from a set of binary referent images, each pixel of the sample image comprising a multi-bit value, the method comprising:

normalizing the size of the sample image to the size of the referent images;

determining a set of candidate images from the set of referent images by performing the following substeps for each referent image:

determining a first binarization threshold and a second binarization threshold, responsive to the first binarization threshold being no greater than the second binarization threshold, selecting the referent image as a candidate, and associating a Hamming distance of zero with the referent image, and responsive to the first binarization threshold being greater than the second binarization threshold, selecting the referent image as a candidate, and provisionally storing the image with its first and second binarization thresholds; and for each candidate, calculating a set of Hamming distances between binarizations of the sample image, binarized at the thresholds in a range between the first binarization threshold and the second binarization threshold for each candidate; and selecting as a match the candidate having a minimum acceptable Hamming distance of all the candidates.

21. The method of claim 20 wherein the substep of determining a first binarization threshold and a second binarization threshold comprises:

partitioning the pixels of the sample image into a foreground portion and a background portion corresponding to a foreground portion and a background portion of a first referent image from the set of referent images;

selecting a maximum pixel value in the background portion of the sample image as a first binarization threshold; and selecting a minimum pixel value in the foreground portion of the sample image minus one as a second binarization threshold.

22. The method of claim 20 wherein the substep of responsive to the first binarization threshold being no greater than the second binarization threshold, selecting the referent image as a candidate, and associating a Hamming distance of zero with the referent image, further comprises:

discarding any previously selected candidates having associated minimum Hamming distances greater than zero.

23. A system for recognizing a sample image comprising a plurality of pixels from a set of binary referent images, each pixel of the sample image comprising a multi-bit value, the system comprising:

a normalization unit for normalizing the size of the sample image to the size of the referent images;

coupled to the normalization unit, a distance calculation unit for determining a Hamming distance, and sending the Hamming distance; and communicatively coupled to the distance calculation unit, a classification unit adapted to:

determining a first binarization threshold and a second binarization threshold for the sample image with respect to a referent image, responsive to the first binarization threshold being no greater than the second binarization threshold, select the referent image as a candidate, associate a Hamming distance of zero with the referent image, and discard any previously selected candidates having associated minimum Hamming distances greater than zero, responsive to the first binarization threshold being greater than the second binarization threshold, select the referent image as a candidate, request the distance calculation unit to calculate and send a Hamming distance calculation between the sample image, binarized at the plurality of thresholds between the first binarization threshold and the second binarization threshold for each candidate, receive the Hamming distance calculation for each candidate, and select as a match the candidate having a minimum acceptable Hamming distance of all the candidates.

24. The system of claim 23, further comprising, coupled to the classification unit, a disambiguation unit for disambiguating the candidate set and selecting a preferred candidate image for recognition by comparing the candidate images with an unnormalized sample image.

25. The system of claim 23, wherein the image to be recognized is a character image.

26. A computer-readable medium having computer-readable code embodied therein for recognizing a sample image comprising a plurality of pixels from a set of binary referent images, each pixel of the sample image comprising a multi-bit value, the computer-readable medium comprising:

computer-readable program code devices configured for normalizing the size of the sample image to the size of the referent images;

computer-readable program code devices configured for determining a set of candidate images from the set of referent images comprising:

computer-readable program code devices configured for determining a first binarization threshold and a second binarization threshold, computer-readable program code devices configured for responsive to the first binarization threshold being no greater than the second binarization threshold, selecting the referent image as a candidate, associating a Hamming distance of zero with the referent image, and computer-readable program code devices configured for responsive to the first binarization threshold being greater than the second binarization threshold, selecting the referent image as a candidate and provisionally storing the image with its first and second binarization thresholds;

computer-readable program code devices configured for calculating a set of Hamming distances between the sample image, binarized at the plurality of thresholds between the first binarization threshold and the second binarization threshold for each candidate; and computer-readable program code devices configured for selecting as a match the candidate having a minimum Hamming distance.

27. The computer-readable medium of claim 26, wherein the computer-readable program code devices configured to perform the substep of determining a first binarization threshold and a second binarization threshold comprises:

computer-readable program code devices configured for partitioning the pixels of the sample image into a foreground portion and a background portion corresponding to a foreground portion and a background portion of a first referent image from the set of referent images;

computer-readable program code devices configured for selecting a maximum pixel value in the background portion of the sample image as a first binarization threshold; and computer-readable program code devices configured for selecting a minimum pixel value in the foreground portion of the sample image minus one as a second binarization threshold.

28. The computer-readable medium of claim 26, wherein the computer-readable program code devices configured to perform the substep of responsive to the first binarization threshold being no greater than the second binarization threshold, selecting the referent image as a candidate, further comprises:

computer-readable program code devices configured for discarding any previously selected candidates having associated minimum Hamming distances greater than zero.

* * * * *

UNITED STATES PATENT AND TRADEMARK OFFICE
CERTIFICATE OF CORRECTION

PATENT NO.    : 6,266,445 B1
DATED         : July 24, 2001
INVENTOR(S)   : Radovan V. Krtolica et al.

It is certified that error appears in the above-identified patent and that said Letters Patent is hereby corrected as shown below:

<u>Title page,</u>
Item [57], ABSTRACT,
Line 2, "a referent" should read -- the referent --.

<u>Drawings,</u>
Sheet 11, Fig. 7E " 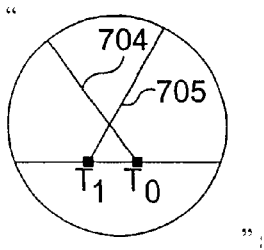 should read -- 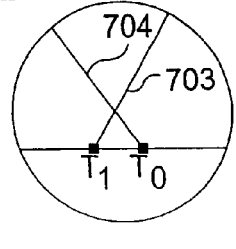 --.

<u>Column 5,</u>
Line 32, "138 unit," should read -- unit 138, --.

<u>Column 8,</u>
Line 63, "image 146 a" should read -- image 146a --.

<u>Column 9,</u>
Line 51, "image 146 a" should read -- image 146a --.

<u>Column 12,</u>
Line 46, "5object" should read -- object --.

<u>Column 13,</u>
Line 31, "an" should read -- a --.

<u>Column 15,</u>
Line 30, "distance," should read -- distance; --.

<u>Column 16,</u>
Line 33, "to" should read -- to, --.
Line 37, "to" should read -- to, --.

UNITED STATES PATENT AND TRADEMARK OFFICE
CERTIFICATE OF CORRECTION

PATENT NO.    : 6,266,445 B1
DATED         : July 24, 2001
INVENTOR(S)   : Radovan V. Krtolica et al.

It is certified that error appears in the above-identified patent and that said Letters Patent is hereby corrected as shown below:

<u>Column 18,</u>
Line 17, "determining" should read -- determine --.

Signed and Sealed this

Eighth Day of October, 2002

Attest:

Attesting Officer

JAMES E. ROGAN
*Director of the United States Patent and Trademark Office*